United States Patent [19]

Kurata et al.

[11] 3,929,881

[45] Dec. 30, 1975

[54] PROCESS FOR HYDRATING A NITRILE TO THE CORRESPONDING AMIDE

[75] Inventors: Tokuzo Kurata; Takeshi Okano, both of Kitakyushu; Akio Tamaru; Yozo Kato, both of Yokohama; Saburo Nagashima, Kawasaki, all of Japan

[73] Assignee: Mitsubishi Chemical Industries, Ltd., Tokyo, Japan

[22] Filed: Aug. 31, 1973

[21] Appl. No.: 393,291

[30] Foreign Application Priority Data

Sept. 2, 1972  Japan.................................. 47-88217
Sept. 4, 1972  Japan.................................. 47-88531
Feb. 14, 1973  Japan.................................. 48-18195

[52] U.S. Cl............ 260/561 N; 252/454; 252/467; 252/474; 252/476; 260/558 R; 260/561 R

[51] Int. Cl.²...................................... C07C 103/08
[58] Field of Search................................ 260/561 N

[56] References Cited
UNITED STATES PATENTS

| 3,597,481 | 8/1971 | Tefertiller et al............... 260/561 N |
| 3,631,104 | 12/1971 | Habermann et al............ 260/561 N |
| 3,642,894 | 2/1972 | Habermann et al............ 260/561 N |
| 3,696,152 | 10/1972 | Habermann et al............ 260/561 N |
| 3,767,706 | 10/1973 | Habermann et al............ 260/561 N |

*Primary Examiner*—Ethel G. Love
*Attorney, Agent, or Firm*—Oblon, Fisher, Spivak, McClelland & Maier

[57] ABSTRACT

A process for catalytically hydrating a nitrile to the corresponding amide by using a copper catalyst prepared by decomposing copper hydride.

31 Claims, No Drawings

PROCESS FOR HYDRATING A NITRILE TO THE CORRESPONDING AMIDE

BACKGROUND OF THE INVENTION

1. Field of the Invention

The present invention relates to a process for hydrating a nitrile to the corresponding amide. More particularly, the present invention relates to a process for catalytically hydrating a nitrile to the corresponding amide in the presence of an improved copper catalyst.

2. Description of the Prior Art

The hydration of a nitrile to the corresponding amide is well known. For example, acrylamide has been prepared by reacting acrylonitrile with water and sulfuric acid to obtain acrylamide sulfate which is neutralized with an alkali to obtain acrylamide.

This process, however, requires large quantities of acid or alkali which renders the process industrially uneconomical.

Various copper catalyst systems are known. Inoue discloses in Japanese patent specification Pub. No. 21295/1970 the use of cuprous oxide as a catalyst. U.S. Pat. No. 3,631,104 discloses a copper catalyst prepared by reducing copper oxide, copper-chromium oxide or copper-molybdenum oxide with hydrogen. Further, OLS 2036126, describes the use of Raney-copper and Ullmann-copper for the hydration reaction. However, these catalysts are difficult to prepare and the activity of the catalysts is low.

SUMMARY OF THE INVENTION

Accordingly, it is one object of the present invention to provide a copper catalyst which exhibits excellent activity for the hydration of a nitrile to the corresponding amide.

It is another object of the present invention to provide an industrially useful process for hydrating a nitrile to the corresponding amide.

Yet another object of the present invention is to provide a novel process for preparing a copper catalyst for the hydration of a nitrile to an amide.

A still further object of the present invention is to provide a useful catalyst for hydrating a nitrile to the corresponding amide.

Briefly, these and other objects of the invention are achieved by preparing the copper catalyst by decomposing copper hydride and using the decomposed catalyst to hydrate a nitrile to the corresponding amide. The activity of the catalyst may be further enhanced if the decomposition is caused to occur in the presence of a catalyst promoter.

DESCRIPTION OF THE PREFERRED EMBODIMENTS

The copper catalyst used in the process of the present invention is obtained by decomposing copper hydride. The copper hydride may be prepared by any method, for example, by treating a copper compound with a reducing agent such as hypophosphorous acid, or a hypophosphite of an alkali metal, such as lithium, sodium, potassium, rubidium and cesium; an alkaline earth metal such as beryllium, magnesium, calcium, strontium and barium; ammonium, aluminum, manganese, iron cobalt, nickel, zinc, cerium, lead, etc., lithium-aluminum hydride (LiAlH$_4$), potassium dioxy diboran [K$_2$B$_2$H$_4$ (OH)$_2$], *magnesium boride, dithionous acid, and dithionites of an alkali metal or an alkaline earth metal.*

The reactant used for preparing the copper hydride, may be any of a variety of copper compounds, such as copper oxide, copper hydroxide, inorganic acid salts such as copper chloride, copper bromide, copper iodide, copper nitrate, copper sulfate, or copper organic acid salts such as copper formate, copper acetate, copper oxalate, copper naphthoate, copper phenyl acetate, a copper benzoate, or the like.

The reaction of the copper compound and the reducing agent is commonly carried out in an aqueous medium although it can be effected in an organic solvent such as a lower alkanol, pyridine, ether, or the like.

The copper compound is preferably dissolved in the liquid medium and reacted with the reducing agent, although, if the copper compound is insoluble, it is sufficient to merely disperse a powder of the copper compound in the medium. In the preparation of copper hydride, the amount of copper compound used is preferably about 0.01 to 5 moles per liter of water or other medium, and the amount of reducing agent is preferably an amount that is sufficient to substantially completely reduce the copper compound to copper hydride. The specific amount will obviously depend upon the specific copper compound and specific reducing agent used.

For example, when using hypophosphorous acid or hypophosphite as a reducing agent, the reaction is preferably carried out under acidic conditions whereby more than about 1 mole of acid, such as sulfuric acid, phosphoric acid, hydrochloric acid, acetic acid, formic acid, or the like is used per 100 moles of copper compound, since the formation of copper hydride is promoted by the presence of acid. If the copper compound is insoluble, the reaction may be run in a slurry state.

If the catalyst is to be supported on a carrier such as activated carbon, carbon black, graphite, alumina, silica gel, or the like the copper compound may be treated with the reducing agent in the same manner as described above in the presence of a carrier, in a suspended state, or the copper compound may be impregnated into a powdery or granular carrier and then treated with the reducing agent as described above.

The reaction temperature is generally within the range of from 0°C to the boiling point of the medium employed, although the specific temperature will depend upon the particular reducing agent employed. For example, when using K$_2$B$_2$H$_4$(OH)$_2$ as the reducing agent, the reaction may be run at 0°C, when NaH$_2$PO$_2$ is used the reaction is run at a temperature of above 20°C, and in the case of LiAlH$_4$, at room temperature.

Also, the reaction is preferably carried out in an inert atmosphere, although it can be carried out under ordinary atmosphere. The reaction pressure is ordinarily normal pressure but it may be reduced pressure or superatmospheric pressure.

The precipitate obtained from the reaction comprises predominantly copper hydride and will occassionally contain some copper metal. This copper metal is assumed to be produced by the reduction of copper ion existing in the reaction system with copper hydride formed by the reduction.

The copper hydride thus obtained is generally employed for preparation of the copper catalyst as such, although it may be isolated from the reduction medium.

The decomposition of the copper hydride can be carried out by a dry or a wet method. In the dry method, copper hydride is heated at its decomposition temperature. The decomposition can be carried out under atmospheric pressure, superatmospheric pressure or reduced pressure and preferably in a nonoxidizing atmosphere. Generally, the decomposition is performed at from room temperature to 300°C, preferably from 40° to 200°C. In the wet method, any medium can be employed, although water is ordinarily used as the medium. Organic solvents such as alcohols, pyridines or ethers may also be used as the reaction medium.

When the decomposition takes place in an aqueous medium, it is advantageous to decompose the copper hydride in the presence of a high concentration of $OH^-$ ion which is produced by adding a basic material such as a hydroxide of an alkali metal, for example caustic soda, since the resulting copper catalyst will have a higher activity. In this instance, the decomposition temperature will ordinarily be from room temperature to 100°C.

The copper hydride obtained by the reduction of the copper compound can be added directly to the nitrile hydration reaction system without any prior solution, so that the decomposition of the copper hydride and hydration of the nitrile can take place simultaneously in the reaction system.

The activity and life of the catalyst can be further improved by incorporating any of a variety of promoter ingredients into the copper metal by having these ingredients present at the time of the decomposition of the copper hydride. The compound added as a promoter ingredient is a compound of an element selected from the group consisting of the Ib group elements of atomic numbers 47 to 79, IIa and IIb group elements of atomic numbers 4 to 80, IIIa and IIIb group elements of atomic numbers 13 to 92, IVa and IVb group elements of atomic numbers 14 to 82, Va and Vb group elements of atomic numbers 15 to 83, VIa group elements of atomic numbers 24 to 74, VIIa group elements of atomic numbers 25 and 75, and VIII group elements of atomic numbers 26 to 78. The groups referred to are those of the Periodic Table, among these compounds, representative examples are compounds of an element selected from Ag, Au, Be, Mg, Ca, Sr, Ba, Zn, Cd, Hg, Al, Sc, Y, La, U, Ga, In, Tl, Si, Ti, Zr, Hf, Ge, Sn, Pb, P, V, Nb, Ta, As, Sb, Bi, Cr. Mo, W, Mn, Re, Fe, Co, Ni, Ru, Rh, Pd, Os, Ir and Pt, and preferably compounds containing an element selected from Cr, Mo, W, V. Si, Fe, Co, Ni, Ru, Rh, Pd, Pt, Ti, and Zr.

These compounds are not limited in the manner of their use but may be used in the form of an oxide, hydroxide, halide such as chloride, bromide and iodide, inorganic acid salts such as sulfate, nitrate, oxyacid salts, and phosphates, organic acid salts such as formate, acetate and oxalate as well as organometallic compounds and coordinate compounds.

Although the quantity of such compounds to be used will be dependent upon the decomposition conditions of the copper hydride, and the kind of compound used, these compounds are usually used in an amount such that the ratio of element contained in the copper metal after decomposing the copper hydride according to the process of the present invention is in the atomic ratio (element/Cu) of from 0.05 to 50%. For example, compounds of Cr, V. Fe, Ti, Zr may be used in an amount so that the atomic ratio of element to copper is from 0.05 –3% and when a Si compound is used, the ratio may be from 0.05 –30%.

When the dry method is used to decompose copper hydride, it is sufficient to heat the copper hydride to its decomposition temperature in the presence of the above described compound, and in this instance, the decomposition can be carried out under atmospheric pressure, superatmospheric pressure or reduced pressure and preferably in an nonoxidizing atmosphere. When the wet method is used any medium can be selected, although, an aqueous medium is commonly used. Alternatively, an organic solvent can be employed as the reaction medium.

When a reaction medium is used, the above described compounds to be added to the copper hydride may be dissolved or suspended in the medium. The method of addition is not particularly critical since it is only necessary to contact the compound with the copper hydride. If an organic acid amide is present when the copper hydride is decomposed in the presence or absence of these promoter ingredients, the activity of the resulting catalyst will be improved. Suitable organic acid amide used for this purpose include the saturated fatty acid amides having 1 to 12 carbon atoms such as formamide, acetamide, propionamide, butyramide heptanamide, lauramide, valeramide urea, etc., unsaturated fatty acid amides such as acrylamide, methacrylamide etc., aromatic acid amides such as benzamide, cinnamamide, phthalamide etc., polyacrylamide, or the like. These amides can be used alone or in admixture.

The amount of organic acid amide used will depend on the decomposition conditions of the copper hydride. When the decomposition reaction occurs in a reaction medium in the so-called wet method, the amount used is from 0.005 to 5%, preferably from 0.01 to 2% based on the weight of medium. When the dry method is used which does not use a medium, the amount is generally from 0.005 to 5%, preferably 0.01 to 2% based on the weight of copper hydride. The use of the organic acid amide in higher concentrations then defined results in a copper catalyst which has an insufficient activity.

When decomposing the copper hydride by the dry method, it is sufficient to merely heat the copper hydride to its decomposition temperature in the presence of the above described organic acid amide, and if desired, also in the presence of the above described promoter ingredient. When the wet method is used, the organic acid amide may be dissolved or suspended in the medium. The method of addition is not critical and it is only necessary to obtain contact with the copper hydride.

Although various nitriles may be used as a reactant for preparing the amide using the present catalyst, generally used are the aliphatic or aromatic nitriles having less than 20 carbon atoms. Specifically suitable are the saturated aliphatic nitriles such as acetonitrile, propionitrile, butyronitrile, pentanonitrile, succinonitrile, adiponitrile, etc., unsaturated aliphatic nitriles such as acrylonitrile, methacrylonitrile, croton-nitrile, 2-cyano-2-butene, 1-cyano-1-octene, 10-undecenonitrile, maleonitrile, furmaronitrile, or the like, or the aromatic nitriles such as benzonitrile, p-toluonitrile, $\alpha$-naphthonitrile, phthalonitrile, or the like. Among these, the olefinic unsaturated nitriles having 3 to 6 carbon atoms are most preferred and most particularly acrylonitrile or methacrylonitrile.

The hydration of the nitrile according to the present process is commonly performed at from room temperature to 300°C using the above described catalyst. When a polymerizable amide, such as acrylamide or methacrylamide is desired, the hydration reaction is carried out at a lower temperature such as, for example, from 50° to 150°C since these amides readily undergo undesirable side reactions. In general, however, the higher temperature, the higher will be the reaction velocity.

The reaction may be carried out using water in amount below the stoichiometric quantity required for the nitrile, although, in general, several to several tens of times the theoretical amount of water is preferably used.

It is possible to use the water in combination with other inert mediums.

The reaction is ordinarily carried out in the liquid phase, although it may be carried out in the gaseous phase or the gaseous and liquid phase. When carrying out the reaction in the reaction in the liquid phase an aqueous solution having a high concentration of nitrile is desirably used. The concentration should be as high as possible so that the resulting amide solution will also have a high concentration.

However, a nitrile solution which is too high in concentration can not be used to carry out the reaction in a homogeneous liquid phase, since the solubility of a nitrile in water is too low.

In such a case, a highly concentrated amide solution can be obtained by replacing part of the water used with a solvent in which the amide is more soluble, such as dimethylformamide, or the like. The reaction can then take place in a homogeneous liquid phase and the solvent can later be removed from the reaction product liquid.

The reaction can be carried out in any ordinary catalytic reaction system such as fixed bed, suspension bed, etc. Also, if a polymerizable amide is desired, a polymerization inhibitor may be added to the reaction system, for example hydroquinone, tertiary butylcatechol or metallic salts, etc.

Having generally described the invention, a further understanding can be obtained by reference to certain specific examples which are provided herein for the purpose of illustration only and are not intended to be limiting unless otherwise specified.

PREPARATION OF CATALYST

Example 1

A solution of 25 g of cupric sulfate pentahydrate dissolved in 150 ml of water was placed into a 500 ml four-necked flask provided with a thermometer, a stirrer and a dropping funnel and 5 g of sulfuric acid was added thereto and heated to 90°C. A solution of 16 g of sodium hypophosphite dissolved in 50 ml of water was added thereto dropwise over 15 minutes. A brown precipitate was produced from the blue solution with the dropping of the sodium hypophosphite solution. As the result of X ray diffraction and measurement of the amount of hydrogen produced by decomposition, this precipitate was estimated to be mostly copper hydride (above 80%). After the dropping was completed, stirring was continued at the same temperature for 30 minutes. A large amount of hydrogen was generated and the precipitate turned to a reddish colored copper metal. The precipitate so obtained was washed with degassed water several times to obtain the desired catalyst. Further, the preparation of the catalyst was carried out in nitrogen atmosphere.

Example 2

A catalyst was prepared in the same manner as in Example 1 with the exception that 53 g of sodium hypophosphite was used and no sulfuric acid was added.

Example 3

A catalyst was prepared in the same manner as in Example 1 except that 20 g of hypophosphorous acid was used in place of sodium hypophosphite, the amount of sulfuric acid used was 2.5 g and dropping time of the hypophosphorous acid solution was 45 minutes.

Example 4

A solution of 25 g of cupric sulfate pentahydrate dissolved in 150 ml of water was placed in the same flask as used in Example 1 and heated to 90°C. A solution of 10.6 g of sodium hypophosphite dissolved in 50 ml of water was added dropwise to this solution over a period of 10 minutes. After the dropping was completed, stirring was continued at the same temperature for 5 minutes.

The precipitate so obtained was mostly copper hydride. After this precipitate was washed with degassed water several times, 300 ml of a 3% NaOH aqueous solution heated to 90°C was added thereto and was stirred for 30 minutes. After alkali was added a large amount of hydrogen was generated. Fine granular copper metal tinged with black was obtained from the above described precipitate.

The copper metal so obtained was washed with degassed water several times to obtain the desired catalyst.

Example 5

Using the same apparatus as in Example 1, a solution of 25 g of cupric sulfate pentahydrate dissolved in 150 ml of water was placed in a flask and heated to 50°C.

A solution of 10.6 g of sodium hypophosphite dissolved in 50 ml of water was added dropwise thereto for 15 minutes. After the dropping was completed, stirring was continued at the same temperature for 2.5 hours. Thereafter a solution of 25 g of NaOH dissolved in 100 ml of water was added thereto and was stirred at the same temperature for 30 minutes.

The precipitate so obtained was washed with degassed water several times to obtain the desired catalyst.

Example 6

A catalyst was prepared in the same manner as in Example 1 with the exception of using 15 g of sodium hypophosphite and not adding sulfuric acid.

Example 7

A catalyst was prepared in the same manner as in Example 1 with the exception of using 32 g of sodium hypophosphite and not adding sulfuric acid.

Example 8

A solution of 25 g of cupric sulfate pentahydrate and 5.7 g of sodium metasilicate monohydrate dissolved in 150 ml of water was placed into the same flask as used in Example 1 and heated to 90°C. A solution of 32 g of sodium hypophosphite dissolved in 50 ml of water was added dropwise thereto over 15 minutes. With the dropping of sodium hypophosphite a brown precipitate was produced from the blue solution. As the result of X-ray diffraction and measurement of the amount of hydrogen produced by the decomposition of the precipitate, the precipitate was estimated to be mostly (above 80%) copper hydride.

After the dropping was completed, stirring was continued at the same temperature for 30 minutes more, a large amount of hydrogen was generated and the precipitate turned to a reddish colored copper metal.

The precipitate so obtained was washed with degassed water several times to obtain the desired catalyst.

The preparation of the catalyst was carried out in a nitrogen atmosphere.

Example 9

A catalyst was prepared in the same manner as in Example 8 with the exception of using 0.117 g of ammonium metavanadate for the sodium metasilicate monohydrate.

Example 10

A solution of 25 g of cupric sulfate pentahydrate and 0.2 g of chromium nitrate monohydrate dissolved in 150 ml of water was placed in the same flask as used in Example 1 and heated to 70°C. Then, a solution of 10.6 g of sodium hypophosphite dissolved in 50 ml of water was added to this solution dropwise.

Five minutes after the formation of the precipitate a solution of 25 g of NaOH dissolved in 100 ml of water was added thereto and stirred at the same temperature for 30 minutes. The precipitate obtained was washed with degassed water several times to obtain the desired catalyst.

Example 11

A catalyst was prepared in the same manner as in Example 10 with the exception of using 0.15 g of sodium bichromate dissolved in an aqueous solution of caustic soda and chromium nitrate was not used.

Example 12

A catalyst was prepared in the same manner as in Example 10 with the exception of using 0.117 g of ammonium metavanadate for the chromium nitrate.

Example 13

A catalyst was prepared in the same manner as in Example 10 with the exception of using 0.28 g of ferric sulfate [$Fe_2(SO_4)_3 \cdot 9H_2O$] for the chromium nitrate.

Example 14

A catalyst was prepared in the same manner as in Example 10 with the exception of using 0.67 g of a 36% aqueous solution of titanium sulfate [$Ti(SO_4)_2$] for the chromium nitrate.

Example 15

A catalyst was prepared in the same manner as in Example 10 with the exception of using 0.13 g of zirconium oxynitrate [$ZrO(NO_3)_2 \cdot 2H_2O$] for the chromium nitrate.

Example 16

A solution of 25 g of cupric sulfate pentahydrate and 0.15 g of acrylamide dissolved in 150 ml of water was placed in the same flask as used in Example 1 and heated to 90°C. A solution of 31.8 g of sodium hypophosphite dissolved in 50 ml of water was added dropwise thereto over a period of 15 minutes. With the dropping of the sodium hypophosphate solution a brown precipitate was produced from the blue solution. As the result of X-ray diffraction and measurement of the amount of hydrogen produced by the decomposition of the precipitate, this precipitate was estimated to be mostly (above 80%) copper hydride.

After the dropping was completed, stirring was continued at the same temperature for 30 minutes, a large amount of hydrogen was generated and the precipitate turned to reddish colored copper metal.

The precipitate obtained was washed with degassed water to obtain the desired catalyst. The preparation of catalyst was carried out in a nitrogen atmosphere.

Example 17

A solution of 25 g of cupric sulfate pentahydrate and 0.15 g of benzamide dissolved in 150 ml of water was placed in the same flask as used in Example 1 and heated to 70°C. A solution of 16 g of sodium hypophosphate dissolved in 50 ml of water was added thereto. Thereafter, a brown precipitate was produced from the blue solution immediately when 3.7 g of sulfuric acid was added thereto. As the result of X-ray diffraction and measurement of the amount of hydrogen produced by decomposition, the precipitate was estimated to be mostly (above 8%) copper hydride.

After the beginning of the formation of copper hydride, the formed precipitate was allowed to stand for 5 minutes and therafter, an aqueous solution of 25 g of NaOH dissolved in 100 ml of water was added dropwise thereto for 10 minutes. After the start of the addition of the NaOH aqueous solution, a large amount of hydrogen was generated and a fine granular copper metal tinged with black was obtained from the above described brown precipitate.

The copper metal so obtained was washed with degassed water several times to obtain the desired catalyst.

HYDRATION REACTION OF A NITRILE

The above described catalysts and 10 ml of a 6.5% acrylonitrile aqueous solution were placed in a 20 ml glass reactor previously purged with nitrogen gas and reacted at 100°C for 30 minutes in a shaker type thermo-regulated bath. The results are summarized as follows:

| Example No. | Catalyst of Additives | Added element/ Cu × 100 | Amount of Catalyst (g) | Yield of Acrylamide (%) |
| --- | --- | --- | --- | --- |
| 1 | — | — | 1.0 | 45.7 |
| 2 | — | — | 1.0 | 59.8 |
| 3 | — | — | 1.0 | 62.3 |
| 4 | — | — | 1.0 | 59.2 |
| 5 | — | — | 1.0 | 77.1 |
| 6 | — | — | 1.0 | 40.7 |
| 7 | — | — | 1.0 | 51.0 |
| 8 | $Na_2SiO_3 \cdot 9H_2O$ | 20 | 1.0 | 90.0 |
| 9 | $NH_4VO_3$ | 1 | 1.0 | 62.2 |
| 10 | $Cr(NO_3)_3 \cdot 9H_2O$ | 0.5 | 0.5 | 85.4 |
| 11 | $Na_2Cr_2O_7$ | 0.5 | 0.5 | 88.9 |
| 12 | $NH_4VO_3$ | 1.0 | 0.5 | 59.9 |
| 13 | $Fe_2(SO_4)_3 \cdot 9H_2O$ | 0.5 | 0.5 | 73.4 |
| 14 | $Ti(SO_4)_2$ | 1.0 | 0.5 | 68.2 |
| 15 | $ZrO(NO_3)_2 \cdot 2H_2O$ | 0.5 | 0.5 | 65.6 |
| 16 | Acrylamide | — | 1.0 | 62.4 |
| 17 | Benzamide | — | 1.0 | 89.6 |

In each reaction, only very small amounts of ethylene cyanohydrin and acrylic acid by-products were observed to be produced and acrylamide was produced almost quantitatively from the starting nitrile.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for preparing an amide which comprises hydrating acrylonitrile or methacrylonitrile to the corresponding amide in the presence of a copper metal catalyst which is obtained by decomposing copper hydride by heating in a non-oxidizing atmosphere at a temperature from room temperature to 300°C.

2. The process of claim 1, wherein said copper hydride is obtained by treating a copper compound selected from the group consisting of oxides, hydroxides, inorganic acid salts and organic acid salts of copper, with a reducing agent selected from the group consisting of hypophosphorous acid, alkali metal, alkaline earth metal, ammonium, aluminum, manganese, iron, cobalt, nickel, zinc, cerium, and lead, hypophosphite, lithium aluminum hydride, potassium dioxyboran, magnesium boride, dithionous acid and alkali metal and alkaline earth metal dithionites.

3. The process of claim 2 wherein when reducing said copper compound with hypophosphorous acid of hypophosphite, a mineral acid selected from the group consisting of sulfuric acid, phosphoric acid and hydrochloric acid is present.

4. The process of claim 1 wherein said copper hydride is decomposed by heating to 40° to 200°C in a non-oxidizing atmosphere.

5. The process of claim 1, wherein said copper hydride is decomposed in the presence of an organic acid amide selected from the group consisting of saturated fatty acid amides, unsaturated fatty acid amides, aromatic acid amides, and polyacrylamide.

6. The process of claim 5 wherein said organic acid amide is acrylamide.

7. The process of claim 5 wherein heating said copper hydride to decompose in the presence of from 0.005 to 5% of said organic acid amide based on the weight of copper hydride.

8. A process of preparing an amide, which comprises: hydrating acrylonitrile or methacrylonitrile to the corresponding amide in the presence of a copper metal catalyst which is obtained by decomposing copper hydride by heating at a temperature from room temperature to about 100°C in a solvent.

9. The process of claim 8 wherein said copper hydride is decomposed at from room temperature to 100°C in an aqueous medium.

10. The process of claim 9 wherein, when decomposing said copper hydride in an aqueous medium, an alkali hydroxide is present in the medium.

11. The process of claim 8, wherein said copper hydride is obtained by treating a copper compound selected from the group consisting of oxides, hydroxides, inorganic acid salts and organic acid salts of copper, with a reducing agent selected from the group consisting of hypophosphorous acid, alkali metal, alkaline earth metal, ammonium, aluminum, manganese, iron, cobalt, nickel, zinc, cerium and lead hypophosphite, lithium aluminum hydride, potassium dioxyboran, magnesium boride, dithionous acid, and alkali metal and alkaline earth metal dithionites.

12. The process of claim 11, wherein when reducing said copper compound with hypophosphorous acid or hypophosphite, a mineral acid selected from the group consisting of sulfuric acid, phosphoric acid, and hydrochloric acid is present.

13. The process of claim 8, wherein said copper hydride is decomposed in the presence of an organic acid amide selected from the group consisting of saturated fatty acid amides, unsaturated fatty acid amides, aromatic acid amides, and polyacrylamide.

14. The process of claim 13 wherein said copper hydride is decomposed in an aqueous medium in the presence of from 0.005 to 5% of said organic acid amide based on the weight of medium.

15. A process for preparing an amide, which comprises: hydrating acrylonitrile or methacrylonitrile to the corresponding amide in the presence of a copper metal catalyst obtained by decomposing copper hydride by heating in a non-oxidizing atmosphere at a temperature from room temperature to 300°C in the presence of a promoter compound of an element selected from the group consisting of Si, V, Fe, Ti, or Zr.

16. The process of claim 15 wherein said element compound is used in an amount so that the ratio of said element to copper in the catalyst is from 0.05 to 50%.

17. The process of claim 16 wherein said compound is a compound of the element V, Fe, Ti or Zr and is present in an amount such that the ratio of said element to copper in the catalyst is from 0.05 to 3%.

18. The process of claim 16 wherein said compound is a Si-compound and is present in an amount so that the atomic ratio of Si/Cu in the catalyst is from 0.05 to 30%.

19. The process of claim 15 wherein said copper hydride is decomposed by heating at 40° to 200°C in the presence of the promoter compound in a non-oxidizing atmosphere.

20. The process of claim 15, wherein said copper hydride is decomposed in the presence of the promoter compound and an organic acid amide selected from the group consisting of saturated fatty acid amides, unsaturated fatty acid amides, aromatic acid amides, and polyacrylamides.

21. The process of claim 20 wherein said organic acid amide is acrylamide.

22. The process of claim 20 wherein said copper hydride is decomposed by heating in the presence of 0.005 to 5%, based on the weight of copper hydride, of the organic acid amide in the presence of the promoter compound.

23. A process for preparing an amide, which comprises:
hydrating acrylonitrile or methacrylonitrile to the corresponding amide in the presence of a copper metal catalyst obtained by decomposing copper hydride by heating at a temperature from room temperature to about 100°C in a solvent in the presence of a promoter compound of an element selected from the group consisting of Si, V, Fe, Ti, or Zr.

24. The process of claim 23, wherein said element compound is used in an amount so that the ratio of said element to copper in the catalyst is from 0.05 to 50%.

25. The process of claim 24, wherein said compound is a compound of the element V, Fe, Ti, or Zr and is present in an amount such that the ratio of said element to copper in the catalyst is from 0.05 to 3%.

26. The process of claim 24, wherein said compound is a Si compound and is present in an amount so that the atomic ratio of Si/Cu in the catalyst is from 0.05 to 30%.

27. The process of claim 23 wherein said copper hydride is decomposed at from room temperature to 100°C in the presence of a promoter compound in an aqueous medium.

28. The process of claim 27 wherein said copper hydride is decomposed in the presence of the promoter compound and an alkali hydroxide in the aqueous medium.

29. The process of claim 24 wherein said copper hydride is decomposed in an aqueous medium in the presence of from 0.005 to 5% of organic acid amide based on the weight of medium and in the presence of the promoter compound.

30. The process of claim 29, wherein said copper hydride is decomposed in the presence of the promoter compound and an organic acid amide selected from the group consisting of saturated fatty acid amides, unsaturated fatty acid amides, aromatic acid amides and polyacrylamide.

31. The process of claim 30, wherein said organic acid amide is acrylamide.

* * * * *